US009819632B2

(12) United States Patent
Marso

(10) Patent No.: US 9,819,632 B2
(45) Date of Patent: Nov. 14, 2017

(54) SYSTEM AND METHOD FOR REMOTELY DIRECTED FILTERING AND SORTING OF NEAR REAL-TIME AUDIO OR VIDEO MESSAGES

(71) Applicant: Larry Scott Marso, San Francisco, CA (US)

(72) Inventor: Larry Scott Marso, San Francisco, CA (US)

( * ) Notice: Subject to any disclaimer, the term of this patent is extended or adjusted under 35 U.S.C. 154(b) by 146 days.

(21) Appl. No.: 14/700,146

(22) Filed: Apr. 30, 2015

(65) Prior Publication Data

US 2016/0323230 A1 Nov. 3, 2016

(51) Int. Cl.
*H04L 12/58* (2006.01)

(52) U.S. Cl.
CPC ............ *H04L 51/32* (2013.01); *H04L 51/12* (2013.01); *H04L 51/16* (2013.01); *H04L 51/20* (2013.01); *H04L 51/10* (2013.01)

(58) Field of Classification Search
CPC ............ H04N 21/478; H04M 3/5334; H04M 3/4226; H04M 1/7255; H04L 12/581; H04L 51/32; H04L 51/20; H04L 51/12; H04L 51/10; H04L 51/16; H04K 1/00; H04H 20/93; G06Q 30/024; G06F 9/542; G06F 17/308; G06F 17/306; G05B 19/404
See application file for complete search history.

(56) References Cited

U.S. PATENT DOCUMENTS

| | | | | |
|---|---|---|---|---|
| 8,024,415 B2* | 9/2011 | Horvitz | ............... | G05B 19/404 709/206 |
| 2003/0115451 A1* | 6/2003 | Walker | ..................... | H04K 1/00 713/153 |
| 2003/0131143 A1* | 7/2003 | Myers | ..................... | G06F 9/542 719/318 |
| 2003/0235407 A1* | 12/2003 | Lord | .................. | H04N 21/4788 386/240 |
| 2004/0019637 A1* | 1/2004 | Goodman | ............. | H04L 12/581 709/204 |
| 2005/0041793 A1* | 2/2005 | Fulton | ............... | H04M 3/42263 379/211.01 |
| 2007/0207727 A1* | 9/2007 | Song | ..................... | H04H 20/93 455/3.06 |
| 2011/0063317 A1* | 3/2011 | Gharaat | ............. | G06Q 30/0244 345/545 |

(Continued)

*Primary Examiner* — Le H Luu

(57) ABSTRACT

Remotely directed filtering and sorting of near real-time audio or video messages is accomplished by including, within a messaging device, a messaging client application capable of assigning via a user interface attributes to an outgoing message, including a filtering assertion and a sorting assertion which express efficiently a sender's judgment about the relevance and currency of past, current and future messages with common attributes. Upon receiving a plurality of near real-time audio or video messages, the messaging client application enables a user to select attributes via a user interface for grouping pending messages, which are filtered and sorted in accordance with procedures that aggregate filtering and sorting assertions associated with messages having common attributes. The messaging client application further displays filtered counts of pending messages and sorted lists of pending messages and, in accordance with such sort, plays the next message when directed by a user interface.

23 Claims, 19 Drawing Sheets

(56) References Cited

U.S. PATENT DOCUMENTS

2012/0173631 A1* 7/2012 Yoakum ............ H04M 3/53341
709/206
2015/0106467 A1* 4/2015 Robarts ............ G06F 17/30867
709/207
2015/0288821 A1* 10/2015 Seth .................... H04M 1/7255
379/88.11
2015/0339373 A1* 11/2015 Carlson ............ G06F 17/30601
707/737

* cited by examiner

FIG. 9

```
801  CREATE TABLE person (
802    _id INTEGER PRIMARY KEY,
803    person_name TEXT UNIQUE NOT NULL,
804    icon TEXT
805  );
806  CREATE TABLE message_type (
807    _id INTEGER PRIMARY KEY,
808    message_type TEXT UNIQUE
809  );
810  CREATE TABLE relation (
811    _id INTEGER PRIMARY KEY,
812    from_person_id INTEGER NOT NULL REFERENCES person ( _id ),
813    to_person_id INTEGER NOT NULL REFERENCES person ( _id ),
814    message_type_id INTEGER NOT NULL REFERENCES message_type ( _id ),
815    urgency_counter INTEGER,
816    flush_counter INTEGER,
817  );
818  CREATE TABLE geo (
819    _id INTEGER PRIMARY KEY,
820    latitude REAL NOT NULL,
821    longitude REAL NOT NULL
822  );
823  CREATE TABLE message (
824    _id INTEGER PRIMARY KEY,
825    message_type_id INTEGER NOT NULL REFERENCES message_type ( _id ),
826    urgency INTEGER,
827    urgency_counter INTEGER,
828    flush INTEGER,
829    flush_counter INTEGER,
830    recorded_epoch INTEGER DEFAULT ( strftime( '%s', 'now' ) * 1000 ),
831    geo_id INTEGER REFERENCES geo ( _id ),
832    reference_person_id INTEGER REFERENCES person ( _id ),
833    reference_message_id INTEGER REFERENCES message ( _id ),
834    sent_epoch INTEGER
835  );
836  CREATE TABLE message_relation (
837    message_id INTEGER NOT NULL REFERENCES message ( _id ),
838    relation_id INTEGER NOT NULL REFERENCES relation ( _id ),
839    played_epoch INTEGER,
840    PRIMARY KEY( message_id, relation_id )
841  );
842  CREATE TABLE tag (
843    _id INTEGER PRIMARY KEY,
844    tag TEXT NOT NULL UNIQUE
845  );
846  CREATE TABLE tag_message (
847    tag_id INTEGER NOT NULL REFERENCES tag ( _id ),
848    message_id INTEGER NOT NULL REFERENCES message ( _id ),
849    PRIMARY KEY( tag_id, message_id )
850  );
851  CREATE TABLE tag_relation (
852    tag_id INTEGER NOT NULL REFERENCES tag ( _id ),
853    relation_id INTEGER NOT NULL REFERENCES relation ( _id ),
854    PRIMARY KEY ( tag_id, relation_id )
855  );
856  CREATE TABLE tag_geo (
857    tag_id INTEGER NOT NULL REFERENCES tag ( _id ),
858    geo_id INTEGER NOT NULL REFERENCES geo ( _id ),
859    PRIMARY KEY ( tag_id, geo_id )
860  );
```

FIG. 10

```
1001  SELECT
1002    _id,
1003    person_name,
1004    icon,
1005    relation_from_me_id,
1006    relation_to_me_id,
1007    count( message_id ) AS counter
1008  FROM (
1009    SELECT
1010      op._id AS _id,
1011      op.person_name AS person_name,
1012      op.icon AS icon,
1013      r._id AS relation_from_me_id,
1014      rr._id AS relation_to_me_id,
1015      m._id AS message_id,
1016      COALESCE (
1017        SUM (
1018          CASE
1019            WHEN m2.recorded_epoch <= m.recorded_epoch
1020            THEN m2.flush
1021          END
1022        ),
1023        0 ) AS cumulative_flush,
1024      COALESCE ( SUM ( m2.flush ), 0 ) AS sum_flush
1025    FROM person p
1026    JOIN relation sr ON ( sr.from_person_id = p._id AND sr.to_person_id = p._id )
1027    JOIN message_type smt ON ( smt._id = sr.message_type_id )
1028    JOIN relation r ON ( r.from_person_id = p._id )
1029    JOIN message_type mt ON ( mt._id = r.message_type_id )
1030    JOIN person op ON ( op._id = r.to_person_id )
1031    JOIN relation rr ON ( rr.from_person_id = op._id AND rr.to_person_id = p._id )
1032    JOIN message_type mt2 ON ( mt2._id = rr.message_type_id )
1033    LEFT JOIN message_relation mr ON ( mr.relation_id = r._id AND mr.played_epoch IS NULL )
1034    LEFT JOIN message m ON ( m._id = mr.message_id )
1035    LEFT JOIN message_relation mr2 ON ( mr2.relation_id = mr.relation_id )
1036    LEFT JOIN message m2 ON ( m2._id = mr2.message_id )
1037    WHERE
1038      p._id = 1
1039      AND (
1040        ( m._id IS NULL AND mr2.rowid IS NULL)
1041        OR m2._id = m._id
1042        OR (
1043          m._id IS NOT NULL
1044          AND m2.flush >= 1
1045        )
1046      )
1047      AND mt.message_type = 'pathway'   -- <INPUT ATTRIBUTE>
1048      AND mt2.message_type = 'pathway'  -- <INPUT ATTRIBUTE>
1049    GROUP BY m._id
1050    HAVING cumulative_flush >= sum_flush
1051  )
1052  GROUP BY _id;
```

FIG. 11

```sql
1101  SELECT
1102      subject_tag_id,
1103      subject_tag,
1104      upper(substr( subject_tag, 1, 2 ) ) AS icon,
1105      relation_from_me_id,
1106      relation_to_me_id,
1107      count( message_id ) AS counter
1108  FROM (
1109      SELECT
1110          st._id AS subject_tag_id,
1111          st.tag AS subject_tag,
1112          r._id AS relation_from_me_id,
1113          rr._id AS relation_to_me_id,
1114          m._id AS message_id,
1115          COALESCE (
1116              SUM (
1117                  CASE
1118                      WHEN m2.recorded_epoch <= m.recorded_epoch
1119                          THEN m2.flush
1120                  END
1121              ),
1122              0 ) AS cumulative_flush,
1123          COALESCE ( SUM ( m2.flush ), 0 ) AS sum_flush
1124      FROM person p
1125      JOIN relation sr ON (
1126          sr.from_person_id = p._id
1127          AND sr.to_person_id = p._id
1128      )
1129      JOIN message_type smt ON ( smt._id = sr.message_type_id )
1130      JOIN tag_relation tr ON ( tr.relation_id = sr._id )
1131      JOIN tag st ON ( st._id = tr.tag_id )
1132      JOIN relation r ON ( r.from_person_id = p._id )
1133      JOIN message_type mt ON ( mt._id = r.message_type_id )
1134      JOIN person cp ON ( cp._id = r.to_person_id )
1135      JOIN relation rr ON (
1136          rr.from_person_id = cp._id
1137          AND rr.to_person_id = p._id
1138      )
1139      JOIN message_type mt2 ON ( mt2._id = rr.message_type_id )
1140      LEFT JOIN message_relation mr ON (
1141          mr.relation_id = r._id
1142          AND mr.played_epoch IS NULL
1143      )
1144      LEFT JOIN tag_message tm ON ( tm.message_id = mr.message_id )
1145      LEFT JOIN message m ON (
1146          m._id = tm.message_id
1147          AND tm.tag_id = st._id
1148      )
1149      LEFT JOIN message_relation mr2 ON ( mr2.relation_id = mr.relation_id )
1150      LEFT JOIN tag_message tm2 ON ( tm2.message_id = mr2.message_id )
1151      LEFT JOIN message m2 ON ( m2._id = tm2.message_id )
1152      WHERE
1153          p._id = 1
1154          AND cp._id = 8 -- <INPUT ATTRIBUTE>
1155          AND (
1156              ( m._id IS NULL AND mr2.rowid IS NULL )
1157              OR m2._id = m._id
1158              OR ( m._id IS NOT NULL AND mr2.message_id = m2._id AND m2.flush >= 1 )
1159          )
1160          AND smt.message_type = 'assistant' -- <INPUT ATTRIBUTE>
1161          AND mt.message_type = 'assistant' -- <INPUT ATTRIBUTE>
1162          AND mt2.message_type = 'assistant' -- <INPUT ATTRIBUTE>
1163      GROUP BY m._id
1164      HAVING cumulative_flush >= sum_flush
1165  )
1166  GROUP BY subject_tag_id;
```

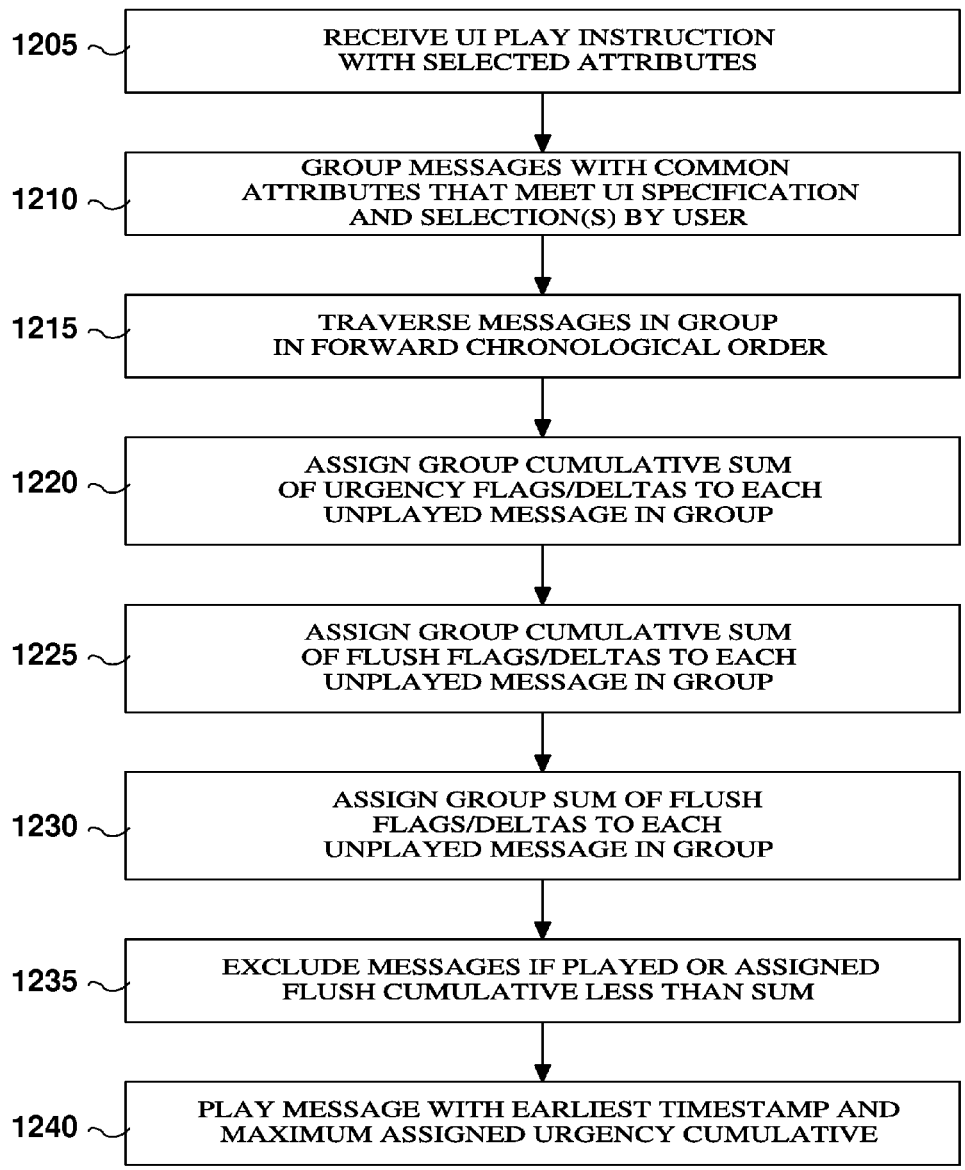

FIG. 13

```
1301  SELECT
1302    m._id,
1303    m.recorded_epoch,
1304    COALESCE (
1305      SUM (
1306        CASE
1307          WHEN m2.recorded_epoch <= m.recorded_epoch
1308          THEN m2.urgency
1309        END
1310      ),
1311    0 ) AS cumulative_urgency,
1312    COALESCE (
1313      SUM (
1314        CASE
1315          WHEN m2.recorded_epoch <= m.recorded_epoch
1316          THEN m2.flush
1317        END
1318      ),
1319    0 ) AS cumulative_flush,
1320    COALESCE ( SUM ( m2.flush ), 0 ) AS sum_flush
1321  FROM message_relation mr
1322  JOIN message m ON ( m._id = mr.message_id )
1323  JOIN relation r ON ( r._id = mr.relation_id )
1324  JOIN message_type mt ON ( mt._id = r.message_type_id )
1325  JOIN message_relation mr2 ON ( mr2.relation_id = r._id )
1326  JOIN message m2 ON ( m2._id = mr2.message_id )
1327  WHERE
1328    mr.relation_id IN ( 10 )         -- <INPUT ATTRIBUTES>
1329    AND mr.played_epoch IS NULL
1330    AND mt.message_type = 'pathway' -- <INPUT ATTRIBUTE>
1331    AND (
1332      m2._id = m._id
1333      OR m2.urgency >= 1
1334      OR m2.flush >= 1
1335    )
1336  GROUP BY m._id
1337  HAVING cumulative_flush >= sum_flush
1338  ORDER BY cumulative_urgency DESC, m.recorded_epoch ASC
1339  LIMIT 1;
```

FIG. 14

```
1401 SELECT
1402   m._id,
1403   m.recorded_epoch,
1404   COALESCE (
1405     SUM (
1406       CASE
1407         WHEN m2.recorded_epoch <= m.recorded_epoch
1408         THEN m2.urgency
1409       END
1410     ),
1411   0 ) AS cumulative_urgency,
1412   COALESCE (
1413     SUM (
1414       CASE
1415         WHEN m2.recorded_epoch <= m.recorded_epoch
1416         THEN m2.flush
1417       END
1418     ),
1419   0 ) AS cumulative_flush,
1420   COALESCE ( SUM ( m2.flush ), 0 ) AS sum_flush
1421 FROM message_relation mr
1422 JOIN message m ON ( m._id = mr.message_id )
1423 JOIN relation r ON ( r._id = mr.relation_id )
1424 JOIN message_type mt ON ( mt._id = r.message_type_id )
1425 JOIN tag_message tm ON ( tm.message_id = m._id )
1426 JOIN tag t ON ( t._id = tm.tag_id )
1427 JOIN message_relation mr2 ON ( mr2.relation_id = r._id )
1428 JOIN message m2 ON ( m2._id = mr2.message_id )
1429 JOIN tag_message tm2 ON (
1430   tm2.message_id = m2._id
1431   AND tm2.tag_id IN ( 2, 3 )
1432 )
1433 WHERE
1434   mr.relation_id = 10              -- <INPUT ATTRIBUTE>
1435   AND mr.played_epoch IS NULL
1436   AND mt.message_type = 'assistant' -- <INPUT ATTRIBUTE>
1437   AND tm.tag_id in ( 2, 3 )         -- <INPUT ATTRIBUTES>
1438   AND (
1439     m2._id = m._id
1440     OR m2.urgency >= 1
1441     OR m2.flush >= 1
1442   )
1443 GROUP BY m._id
1444 HAVING cumulative_flush >= sum_flush
1445 ORDER BY cumulative_urgency DESC, m.recorded_epoch ASC
1446 LIMIT 1;
```

FIG. 15

```
1501  UPDATE relation
1502  SET
1503     urgency_counter = urgency_counter + <urgency>,    -- from transport data record
1504     flush_counter = flush_counter + <flush>           -- from transport data record
1505  WHERE _id = <relation_id>;                           -- from transport data record
1506
1507  INSERT INTO message (
1508     _id,
1509     message_type_id,
1510     urgency,
1511     urgency_counter,
1512     flush,
1513     flush_counter,
1514     recorded_epoch
1515  )
1516  SELECT
1517     <message_id>,                                     -- from transport data record
1518     <message_type_id>,                                -- from transport data record
1519     <urgency>,                                        -- from transport data record
1520     r.urgency_counter,
1521     <flush>,                                          -- from transport data record
1522     r.flush_counter,
1523     <recorded_epoch>                                  -- from transport data record
1524  FROM relation r
1525  WHERE r._id = <relation_id>                          -- from transport data record
1526
1527  SELECT
1528     p._id AS _id,
1529     COUNT ( m._id ) AS counter,
1530  FROM relation r
1531  JOIN message_type mt ON ( mt._id = r.message_type_id )
1532  JOIN person p ON ( p._id = r.to_person_id )
1533  LEFT JOIN message_relation mr ON (
1534     mr.relation_id = r._id
1535     AND mr.played_epoch IS NULL
1536  )
1537  LEFT JOIN message m ON (
1538     m._id = mr.message_id
1539     AND (
1540        m.flush_counter IS NULL
1541        OR m.flush_counter = r.flush_counter
1542     )
1543  )
1544  WHERE mt.message_type = 'pathway'
1545  GROUP BY p._id;
1546
1547  SELECT
1548     m._id,
1549     m.recorded_epoch AS recorded_epoch,
1550     m.urgency_counter AS urgency_counter
1551  FROM message m
1552  JOIN message_relation mr ON ( mr.message_id = m._id )
1553  JOIN relation r ON ( r._id = mr.relation_id )
1554  JOIN message_type mt ON ( mt._id = r.message_type_id )
1555  LEFT JOIN person rp ON ( rp._id = m.reference_person_id )
1556  LEFT JOIN message rm ON ( rm._id = m.reference_message_id )
1557  WHERE
1558     r._id = <INPUT ATTRIBUTE>
1559     AND mt.message_type = 'pathway'
1560     AND (
1561        m.flush_counter IS NULL
1562        OR m.flush_counter = r.flush_counter
1563     )
1564  GROUP BY m._id
1565  ORDER BY urgency_counter DESC, recorded_epoch ASC
1566  LIMIT 1;
```

FIG. 17

```
1701  SELECT
1702    m._id AS message_id,
1703    m.recorded_epoch AS recorded_epoch,
1704    op.person_name AS person_name,
1705    op.icon AS icon,
1706    r._id AS relation_from_me_id,
1707    rr._id AS relation_to_me_id,
1708    COALESCE (
1709      SUM (
1710        CASE
1711          WHEN m2.recorded_epoch <= m.recorded_epoch
1712          THEN m2.urgency
1713        END
1714      ),
1715      0 ) AS cumulative_urgency,
1716    COALESCE (
1717      SUM (
1718        CASE
1719          WHEN m2.recorded_epoch <= m.recorded_epoch
1720          THEN m2.flush
1721        END
1722      ),
1723      0 ) AS cumulative_flush,
1724    COALESCE ( SUM ( m2.flush ), 0 ) AS sum_flush
1725  FROM person p
1726  JOIN relation sr ON ( sr.from_person_id = p._id AND sr.to_person_id = p._id )
1727  JOIN message_type smt ON ( smt._id = sr.message_type_id )
1728  JOIN relation r ON ( r.from_person_id = p._id )
1729  JOIN message_type mt ON ( mt._id = r.message_type_id )
1730  JOIN person op ON ( op._id = r.to_person_id )
1731  JOIN relation rr ON ( rr.from_person_id = op._id AND rr.to_person_id = p._id )
1732  JOIN message_type mt2 ON ( mt2._id = rr.message_type_id )
1733  LEFT JOIN message_relation mr ON ( mr.relation_id = r._id AND mr.played_epoch IS NULL )
1734  LEFT JOIN message m ON ( m._id = mr.message_id )
1735  LEFT JOIN message_relation mr2 ON ( mr2.relation_id = mr.relation_id )
1736  LEFT JOIN message m2 ON ( m2._id = mr2.message_id )
1737  WHERE
1738    p._id = 1
1739    AND r.to_person_id = 8
1740    AND mr.played_epoch IS NULL
1741    AND (
1742      ( m._id IS NULL AND mr2.rowid IS NULL )
1743      OR m2._id = m._id
1744      OR ( m._id IS NOT NULL AND ( m2.flush >= 1 OR m2.urgency >= 1 ) )
1745    )
1746    AND mt.message_type = 'pathway'  -- <INPUT ATTRIBUTE>
1747    AND mt2.message_type = 'pathway' -- <INPUT ATTRIBUTE>
1748  GROUP BY m._id
1749  HAVING cumulative_flush >= sum_flush
1750  ORDER BY cumulative_urgency DESC, m.recorded_epoch ASC;
```

FIG. 18

```
1801  SELECT
1802    st._id AS subject_tag_id,
1803    st.tag AS subject_tag,
1804    r._id AS relation_from_me_id,
1805    rr._id AS relation_to_me_id,
1806    m._id AS message_id,
1807    COALESCE (
1808      SUM (
1809        CASE
1810          WHEN m2.recorded_epoch <= m.recorded_epoch
1811          THEN m2.urgency
1812        END
1813      ),
1814      0 ) AS cumulative_urgency,
1815    COALESCE (
1816      SUM (
1817        CASE
1818          WHEN m2.recorded_epoch <= m.recorded_epoch
1819          THEN m2.flush
1820        END
1821      ),
1822      0 ) AS cumulative_flush,
1823    COALESCE ( SUM ( m2.flush ), 0 ) AS sum_flush
1824  FROM person p
1825  JOIN relation sr ON (
1826    sr.from_person_id = p._id
1827    AND sr.to_person_id = p._id
1828  )
1829  JOIN message_type smt ON ( smt._id = sr.message_type_id )
1830  JOIN tag_relation tr ON ( tr.relation_id = sr._id )
1831  JOIN tag st ON ( st._id = tr.tag_id )
1832  JOIN relation r ON ( r.from_person_id = p._id )
1833  JOIN message_type mt ON ( mt._id = r.message_type_id )
1834  JOIN person cp ON ( cp._id = r.to_person_id )
1835  JOIN relation rr ON ( rr.from_person_id = cp._id AND rr.to_person_id = p._id )
1836  JOIN message_type mt2 ON ( mt2._id = rr.message_type_id )
1837  LEFT JOIN message_relation mr ON ( mr.relation_id = r._id AND mr.played_epoch IS NULL )
1838  LEFT JOIN tag_message tm ON ( tm.message_id = mr.message_id )
1839  LEFT JOIN message m ON ( m._id = tm.message_id AND tm.tag_id = st._id )
1840  LEFT JOIN message_relation mr2 ON ( mr2.relation_id = mr.relation_id )
1841  LEFT JOIN tag_message tm2 ON ( tm2.message_id = mr2.message_id )
1842  LEFT JOIN message m2 ON ( m2._id = tm2.message_id )
1843  WHERE
1844    p._id = 1
1845    AND cp._id = 8 -- <INPUT ATTRIBUTE>
1846    AND mr.played_epoch IS NULL
1847    AND (
1848      ( m._id IS NULL AND mr2.rowid IS NULL )
1849      OR m2._id = m._id
1850      OR ( m._id IS NOT NULL AND ( m2.flush >= 1 OR m2.urgency >= 1 ) )
1851    )
1852    AND smt.message_type = 'assistant' -- <INPUT ATTRIBUTE>
1853    AND mt.message_type = 'assistant'  -- <INPUT ATTRIBUTE>
1854    AND mt2.message_type = 'assistant' -- <INPUT ATTRIBUTE>
1855  GROUP BY m._id
1856  HAVING cumulative_flush >= sum_flush
1857  ORDER BY cumulative_urgency DESC, m.recorded_epoch ASC;
```

SYSTEM AND METHOD FOR REMOTELY DIRECTED FILTERING AND SORTING OF NEAR REAL-TIME AUDIO OR VIDEO MESSAGES

BACKGROUND OF THE INVENTION

"Instant messaging" applications attempt to deliver notifications and content as soon as possible. However, the experience is often far from near real-time, instead reminiscent of explicitly asynchronous predecessors. Network connections fail or manifest latency. Servers under heavy load queue and hold messages before redistribution. A party on one side of a conversation sends a message, but the recipient is not simultaneously available or interested, or is reviewing messages from other senders with the same application. A group chat sends messages to every participant, increasing the number received and the difficulty of keeping current. Multicasting and repeated forwarding of messages to large, overlapping social networks also increase the number received, unpredictably, and weaken the association between message and recipient so much that a reasonable prima facie assumption is that no incoming message is personal, significant or worthy of immediate review.

Yet the most common lower-level user interface in instant messaging is a stream view that anticipates near real-time interaction. Incoming and outgoing messages are positioned sequentially in forward or reverse chronological order. A recipient who is inattentive to actively streaming messages must scroll backward to pick up the conversation. If the stream has moved on to other topics, responses require context and repetition. The most common higher-level user interface is a list of users or chat groups, sorted alphabetically or in forward or reverse chronological order, with message counters that indicate little more than streams charging ahead unheeded.

Attempts to adapt message organizing methods from explicitly asynchronous predecessors have been mixed. The most common user interface for Internet email is a threaded view which groups messages by common subject and identifies which messages reply to other messages. Such subject grouping and threading, applied to instant messaging, so changes the user experience that most participants view the application as a different category of service with alternative nomenclature. For example, on Facebook, a message multicast in near real-time to a social network and rendered in a stream is a "posting" on a "Timeline", threaded responses are "comments" or "likes", subject headings refer to embedded content, and threads reappear with each new activity. Most users view this near real-time service as a social bulletin board, not instant messaging. On Twitter, a message multicast in near real-time to a social network and rendered in a stream is a "tweet" (or if forwarded, a "retweet"), words that proxy for subject are "hashtags", and replies, although threaded in a lower-level interface, are filtered so that only messages from social network connected senders appear in a receiver's stream. Most users view this near real-time service as "microblogging" or broadcasting, not instant messaging.

Despite the proliferation of multimedia content on the Internet, instant message applications remain predominantly textual, with photographs the most typical multimedia content. Text requires more time to type than to read—particularly on a mobile device—which limits the number of messages sent and, from the standpoint of recipients, limits the number of incoming messages. Text and photographs are skimmable; without reading every word or studying every image, recipients recognize interesting content in a swiftly flowing stream. Practical limits on content production, and the possibility of selective and rapid content consumption, have been advantageous to instant messaging of text and photography.

Audio and video recordings can require less time to create than text messages, and offer potentially rich and personalized content; but take longer for a recipient to experience and interpret than text or photography. There is no practical way to skim audio or video recordings for interesting content. Instant messaging applications that support audio or video messages typically treat the content as supplementary; the most common lower-level user interface embeds media play buttons in a stream of skimmable text that provides context and rationale to push individual play buttons.

Attempts in the prior art to put audio or video recordings at the forefront of instant messaging have been problematic. Audio or video messages delivered in any significant volume, without accompanying skimmable content, quickly accumulate into unmanageable reservoirs akin to the "full voicemail box" in telephony. Users are reluctant to send audio or video recordings, not knowing whether a message will be played or left to accumulate, or whether more important or more current information will soon be available to send. The more messages sent, the harder to hold a near real-time conversation when the opportunity arises. If a recipient responds to messages played in chronological order, any backlog renders the communication asynchronous, even when both parties are simultaneously attentive and engaged. If a recipient responds to messages played in reverse chronological order, it disrupts the natural flow of conversation. Explicit threading of audio or video messages, without accompanying skimmable content, is difficult and of lesser value than in text messaging; if a newly received audio or video message relates to an older such message, the recipient often must replay it to appreciate the context.

BRIEF SUMMARY OF THE INVENTION

The following presents a simplified summary of the disclosure in order to provide a basic understanding of some aspects. It is not intended to identify key or critical elements of the disclosure or to delineate the scope of the disclosure. It merely presents some concepts of the disclosure in a simplified form as a prelude to the more detailed description provided below.

The present invention relates generally to the field of instant messaging, and addresses deficiencies of the prior art with a novel and non-obvious system and method for remotely directed filtering and sorting of near real-time audio or video messages. In some embodiments, the sender of an audio or video message can, via user interface elements, identify it and messages that follow as having greater importance, or "urgency", than messages sent before; furthermore, the sender of an audio or video message can, via user interface elements, identify messages that preceded it as having such lesser relevance and currency that they are obsolete, or "flushed". Data comprising the audio or video instant message include corresponding "urgency" and "flush" indicators that influence presentation for the recipient as follows. Unplayed audio or video messages, grouped according to common attributes, render by default for the recipient in forward chronological order by recording time. In accordance with aspects of the present invention, once an "urgency" flagged message is received, the message, and subsequently recorded messages with selected common attributes, render prior to unplayed messages with such attributes and an earlier recording time. Once a "flush" flagged message is received, prior messages with selected common attributes are no longer playable. Importantly, messages need not share a common subject or discussion identifier, or relate back to a specific prior message, to affect the manner or order of presentation, as in a threaded approach.

In video near real-time audio or video messaging, the present invention offers substantial advantages over the prior art. In embodiments that implement the one-on-one exchange of messages, incoming messages may be grouped and playable according to a common sender. In accordance with one or more aspects of the present invention, users may talk on demand and at length, without fear of filling an inbox with messages of limited time value, or expected to be presented in an inopportune order, regardless of whether the recipient is immediately available. Via simple and convenient user interface elements, a sender can signal that material created from that moment forward should be presented before older material, or that older material should not be presented at all. A recipient can wait until a convenient time to listen or view, and expect that the first playable message is the most important in accordance with the sender's most recent judgment, that messages of equal importance will be presented in forward chronological order, and that no out of date messages remain in the queue.

When a recipient is inattentive and a backlog develops, aspects of the present invention facilitate a transition to near real-time interaction for follow-up questions or comments. With a single user interface "urgency" action, any sender can cause a new message, and messages that follow, to be presented before an outstanding backlog. If responses suggest that the other party is confused backlogged messages, then a sender can, with a single user interface action, "flush" the backlog and substitute new messages. These advantages flow from the present invention without complex management by sender or recipient of discussion threads.

The embodiment described above groups incoming messages by sender. Some alternative embodiments, prior to the application of "urgency" and/or "flush", group messages according to additional or alternative common attributes, such as categories of message type, subject tags, geotags, group chat participations, social network connections between users, or measurements of social network proximity, at the option of the recipient.

Some alternative embodiments permit the sender to designate deltas, positive and negative values, instead of a simple flag or boolean, that apply a direction and intensity to "urgency" and "flush".

Additional aspects of the invention will be set forth in part in the description, will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute part of this specification, illustrate embodiments of the invention and, together with the description, serve to explain the principles of the invention. The embodiments illustrated herein are presently preferred, it being understood, however, that the invention is not limited to the precise arrangements and instrumentalities shown, wherein:

FIG. 9 is an SQLite database definition illustrating an exemplary representation of data associated with near real-time audio or video messages;

FIG. 10 is an SQLite database query illustrating an exemplary implementation of grouping and filtering near real-time audio or video messages that aggregates advantageously reduced sets grouped according to sender;

FIG. 11 is an SQLite database query illustrating an exemplary implementation of grouping and filtering near real-time audio or video messages that aggregates advantageously reduced sets grouped according to subject tag;

FIG. 12 is a flowchart illustrating an exemplary process for grouping, filtering and sorting near real-time audio or video messages that plays the next message from an advantageously reduced set sorted in an advantageous order;

FIG. 13 is an SQLite database query illustrating an exemplary implementation of grouping, filtering and sorting near real-time audio or video messages from one or more selected senders, that identifies the next to play from an advantageously reduced set sorted in an advantageous order;

FIG. 14 is an exemplary implementation of an SQLite database query that identifies the next message to play from an advantageously reduced set of near real-time audio or video messages, associated with one or more selected subject tags, sorted in an advantageous order;

FIG. 15 is a series of SQLite operations illustrating an exemplary implementation in which cumulations and summations are precalculated;

FIG. 17 is an exemplary implementation of an SQLite database query, similar to FIG. 13, that produces an advantageously sorted list of near real-time audio or video messages available for play, associated with one or more selected senders, after an advantageous reduction;

FIG. 18 is an exemplary implementation of an SQLite database query, similar to FIG. 14, that produces an advantageously sorted list of near real-time audio or video messages available for play, associated with one or more selected subject tags, after reduction and sorting.

DETAILED DESCRIPTION OF THE INVENTION

The following detailed description is of the best currently contemplated modes of carrying out exemplary embodiments of the invention. The description is not intended to be taken in a limiting sense, but is merely for the purpose of illustrating the general principles of the invention.

Figure 1:
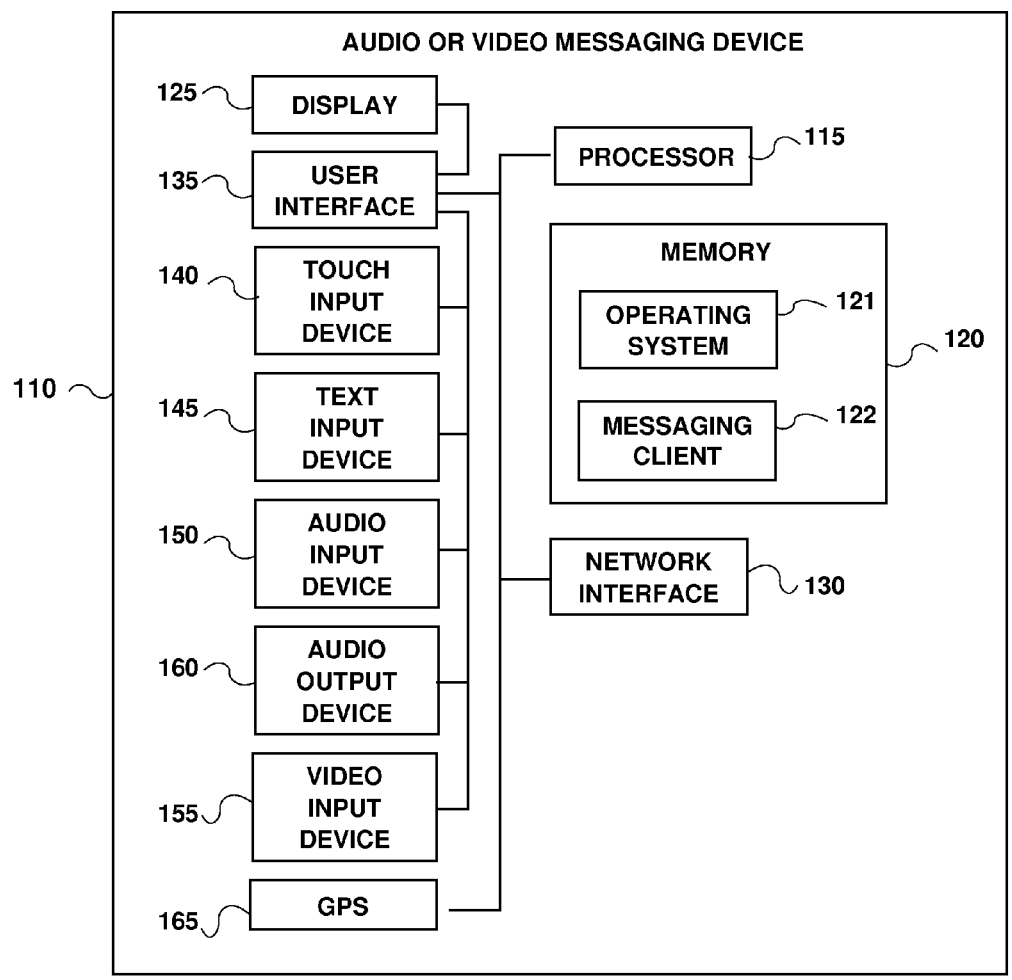
FIG. 1 illustrates an exemplary near real-time audio or video messaging device.

FIG. 1 illustrates an exemplary audio or video near real-time messaging device for use with embodiments of the present invention. The audio or video near real-time messaging device 110 is a user-operated physical apparatus capable of sending and receiving near real-time audio or video messages over a network. Examples of such a device include, without limitation, a desktop computer, a laptop computer, and a mobile phone, alone or in conjunction with bluetooth connected auxiliary devices, such as a headset or wristwatch, or other user-operated communication device.

Such an exemplary device generally includes a processor 115, memory 120, a display 125 and an interface to a network connection 130; and provide a user interface 135 which integrates facilities, or embedded or accessible devices for input from the user, such as a touch input device 140, text input device 145, an audio input device 150, and a still image and/or video input device 155; and for output to the user, including a audio output device 160 and such display 125; and may include additional facilities to capture accessible data or information, such as GPS sensors 165 that collect global positioning system data. As used herein, the term "processor" is generally understood to be a device that drives a general-purpose computer. It is noted, however, that other processing devices, such as microcontrollers, Field Programmable Gate Arrays (FPGAs), Application Specific Integrated Circuits (ASICs), or a combination thereof, can be used to achieve the benefits and advantages of the present invention. As used herein, the term "memory" is generally understood to be RAM memory, ROM memory, EPROM memory, EEPROM memory, non-volatile RAM (NVRAM) memory, flash memory, magnetic media disk drives, optical drives, and other equipment or media for short and long term data storage. The above memory types are exemplary only, and are thus not limiting as to the types of memory usable within the present invention.

For example, within the memory 120 is shown an operating system 121 and a near real-time audio or video messaging client application 122 that consists of instructions executable by the processor. To send and/or play near real-time audio or video messages, the user activates the device 110, and via the user interface 135, runs the client application 122. The client application is operable to send near real-time audio or video messages via the network interface 130, upon user specification of message attributes, and an instruction to record provided via the input devices 140, 145, 150 and/or 155 which prompts the recording of an audio message via the audio input device 150 or a video message via the audio and/or video input devices 150 and 155; and is operable to play messages received via the network interface 130, upon user specification of message attributes, and an instruction to play provided via the input devices 140, 145, 150 and 155 which prompts the playing of an audio message via the audio output device 160 or a video message via the audio output device 160 and/or the display 125. The client application may, either itself or via an associated background process, receive messages in near real-time via the network interface 130 and store a representation thereof in the memory 120; and provide notifications of new messages to the user via the audio output device 160 and/or the display 125, and present lists of individual messages or aggregates of unplayed messages via the display 125 in accordance with user interface 135 interactions.

Figure 2:
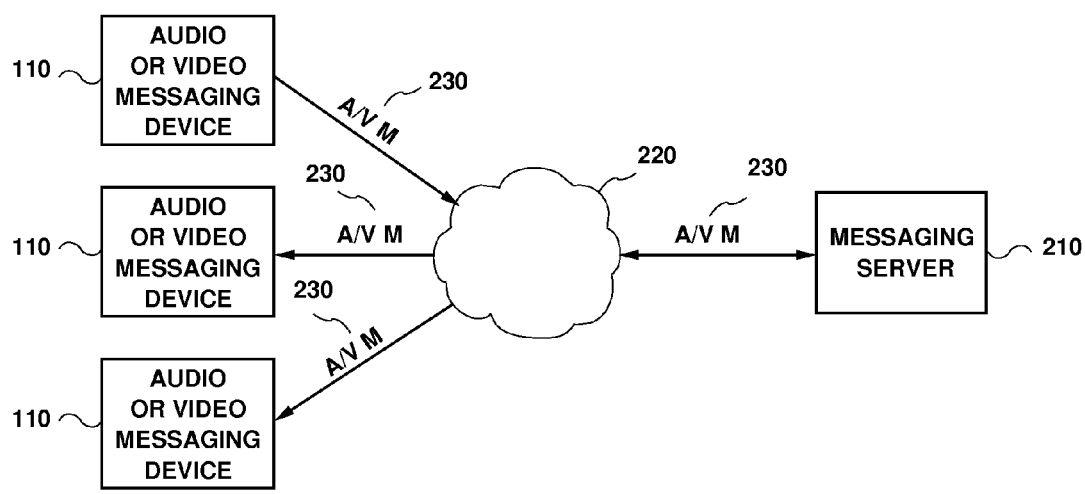
FIG. 2 illustrates an exemplary near real-time audio or video messaging communication system.

FIG. 2 illustrates an exemplary communication system for near real-time audio or video instant messaging. The communication system includes a plurality of messaging devices 110 and a messaging server 210, interconnected by a network 220 over which travel near real-time audio or video messages 230. The messaging server 210 receives a message 230 from a messaging device 110, processes and, in some cases, transforms the message based on its content and associated metadata, and routes, redirects or reflects the message to one or more messaging devices 110. In alternative embodiments, peer-to-peer methods, known to practitioners of the art, transport messages from one device to another without the intermediation of a messaging server.

Figure 3:
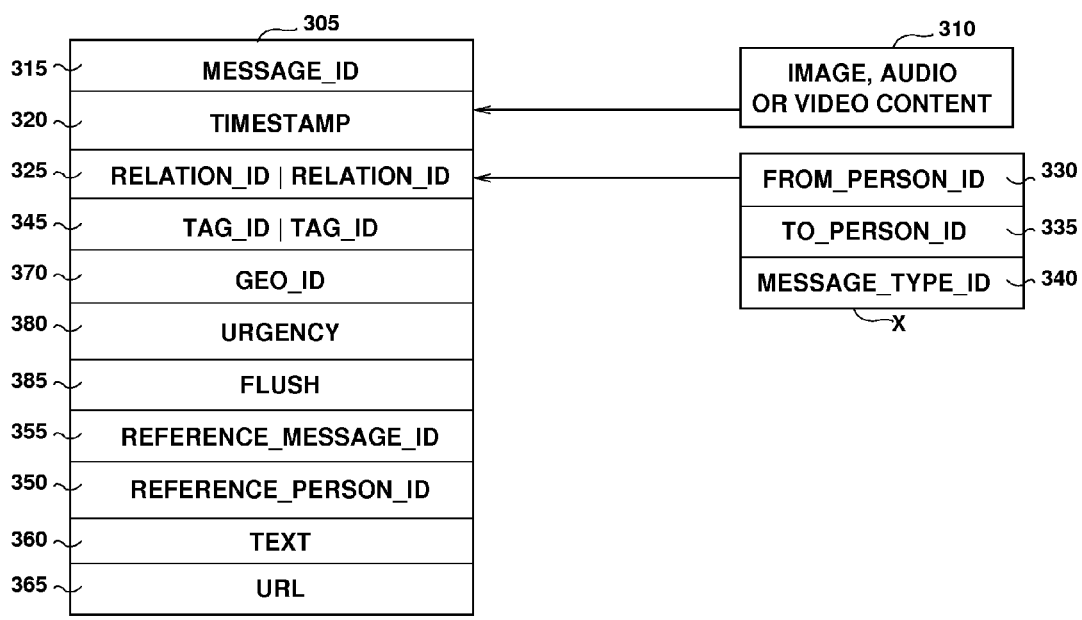
FIG. 3 illustrates an exemplary serialized transport data record format for an near real-time audio or video message.

FIG. 3 illustrates an exemplary serialized transport data record format 305 in accordance with a preferred embodiment of the present invention. The format is purely illustrative of general concepts in near real-time messaging and not meant to be comprehensive; a number of other fields or field structures, formats and representations thereof will occur to practitioners of the art with the benefit of the disclosure. While this illustration references relational concepts, it is in no way intended to limit application of the present invention to relational database approaches.

In accordance with methods known by practitioners of the art with respect to databases in near real-time messaging systems, relational databases generally and the serializing of data for transport, in such exemplary data record format, message_id 315 uniquely identifies a message. timestamp 320, with additional seeded random data, represents the recording time reported by the message sending device 110 and also provides a unique pointer to the audio or video content of the message 310, for example, a compressed digital audio or video file. relation_id 325 references a relationship from one user 330 to another 335, authorizing a reverse-direction communication pathway of a particular type referenced by message_type_id 340; alternatively, relation_id references a relationship between one user and a notional user representing a special purpose service mediated by the messaging server 210. One or more relation_id references in the data record specify the intended recipients; or, alternatively, trigger special purpose services mediated by the messaging server 210, such as group chats or social network multicast facilities, which utilize fields of the data record and/or additional data accessible by the messaging server to replace or augment fields of the data record, such as relation_id references. Optionally, one or more tag_id references 345 identify words or phrases as subject tags associated with a message. Optionally, geo_id 370 references geolocation information associated with a message. Optionally, reference_person_id 350 identifies the sender in contexts where relation_id relates to a special purpose facility mediated by the messaging server, as in a group chat or a social network multicast facility. Optionally, reference_message_id 355 identifies a prior message with which the current message is associated. Additional optional fields include a text message 360 or URL 365 that accompanies the audio or video message. Parallel or separate background processes on the messaging device 110 and the messaging server 210 retrieve, transmit, receive and inject transport data records 305, audio and/or video content 310, and referenced relational database records if new to recipients.

In accordance with a preferred embodiment of the present invention, and illustrating some of its original, innovative and advantageous aspects, an additional field in the exemplary transport data record 305 is urgency 380, a boolean or flag that represents a judgment that the current message, and messages with common attributes that follow (by implication, with the same intended recipients), are of greater importance than messages with common attributes sent before; another additional field is flush 385, a boolean or flag that represents a judgment that messages with common attributes sent before are of such lesser relevance and currency that they are obsolete.

In an alternative preferred embodiment, urgency 380 is a delta (a positive or negative change value) that reflects the direction and intensity of a judgment about the relative importance of the current message and messages with common attributes that follow, compared to messages with common attributes sent before; and flush 385 is a delta that reflects the direction and intensity of a judgment about the relevance, currency (and potential obsolescence) of messages with common attributes sent before. For example, such a delta might be chosen from −3, −2, −1, 1, 2 or 3.

Figure 4:
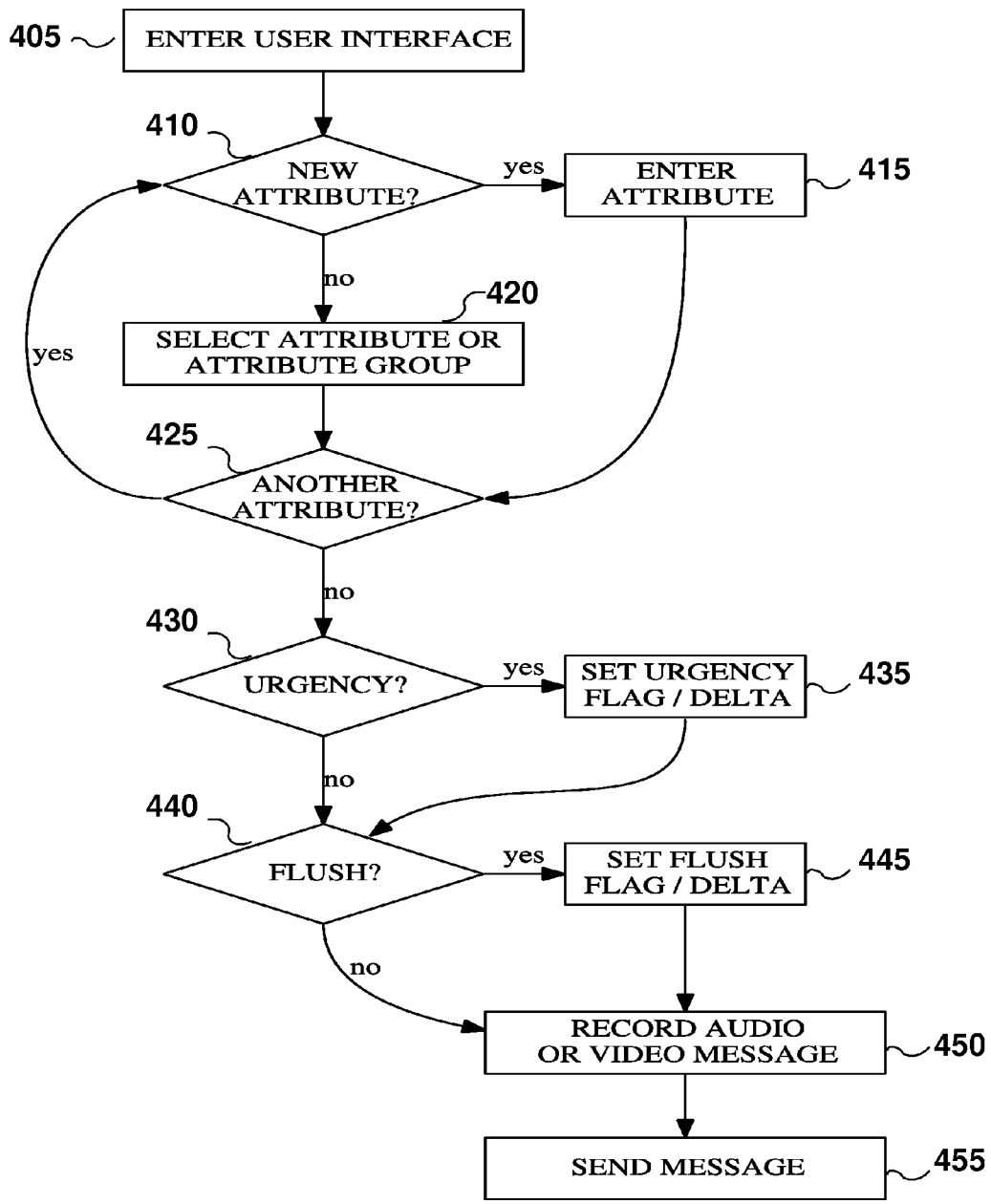
FIG. 4 is a flowchart illustrating an exemplary user interface process for user input and selection of attributes, recording and sending of a near real-time audio or video message.

FIG. 4 is a flowchart illustrating an exemplary user interface process for user input and selection of attributes, and the recording and sending of an audio or video near real-time message. In accordance with methods known by practitioners of the art, the user enters the user interface of the client application 405 and steps through an iterative process for entering and/or selecting attributes to be associated with the next outbound audio or video message 230. If the next attribute is new 410, the user submits the attribute 415 via a user interface for data entry; for example, the user might provide a new recipient person name or subject tag by typing into a text entry widget. If the next attribute is not new, the user selects an attribute or attribute bundle among options presented in the user interface 420; for example, the user might select one or more recipient person names or subject tags from a presented list or representative icon set. If there is another attribute 425, the user repeats the steps beginning with 410, with the user interface potentially updating to present new options. The iterative nature of this procedure reflects standard practices in the art to present higher and lower level user interfaces that offer an accessible user experience of "drilling down" to assign values to multiple attributes.

In accordance with a preferred embodiment of the present invention, and illustrating some of its original, innovative and advantageous aspects, in FIG. 4, the user considers, in the context of the selected attributes, the importance of upcoming messages to be recorded 430 and therefore whether to set an "urgency" flag/delta 435; and the relevance and currency of messages sent before 440 and therefore whether to set a "flush" flag/delta 445, before proceeding to record 450 and send 455 a near real-time audio or video message.

Figure 5:
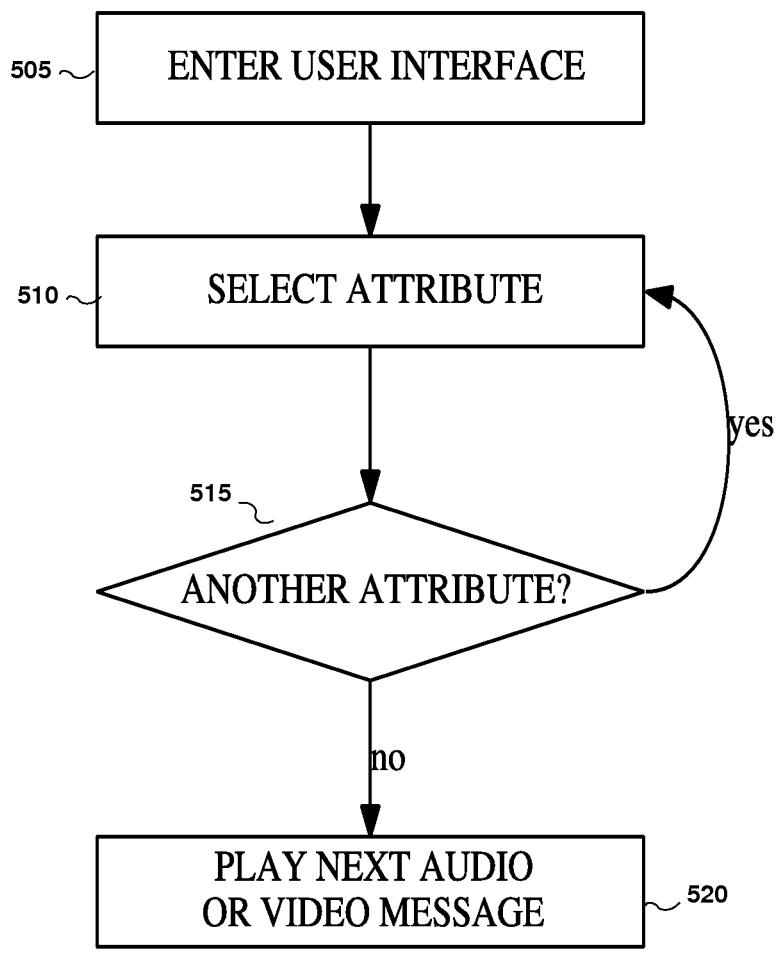
FIG. 5 is a flowchart illustrating an exemplary user interface process for user selection of attributes, and playing a next near real-time audio or video message.

FIG. 5 is a flowchart illustrating an exemplary user interface process for user selection of attributes, and playing a next audio or video near real-time message. In accordance with methods known by practitioners of the art, the user enters the user interface of the client application 505 and steps through an iterative process for entering and/or selecting attributes associated with audio or video messages 230 that have already been received prior to the user providing an instruction to play the next message. The user selects an attribute or attribute bundle among options presented in the user interface 510. If there is another attribute 515, the user repeats step 510, with the user interface potentially updating to present new options. (An entry step is of less importance here, as the user interface for attribute selection can adapt to include new options upon the arrival of additional messages). The iterative nature of this procedure reflects the standard practice in the art to present higher and lower level user interfaces that offer an accessible user experience of "drilling down" to assign values to multiple attributes.

In accordance with a preferred embodiment of the present invention, and illustrating some of its original, innovative and advantageous aspects, in FIG. 5, when the user proceeds to play 520 the next audio or video message, the message chosen will reflect "urgency" and "flush" provided by senders of messages with common attributes.

Figure 6:
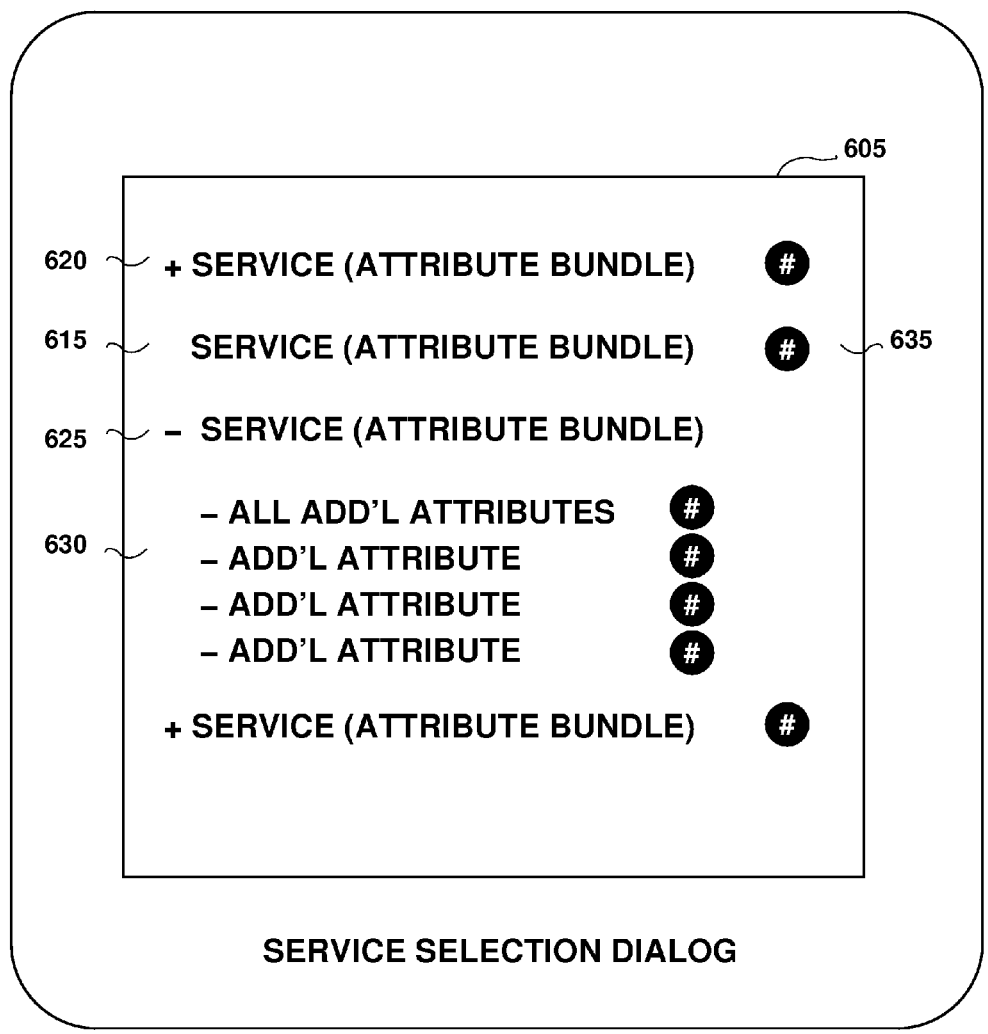
FIG. 6 illustrates an exemplary higher-level user interface for user selection of attributes, or bundles of attributes, in respect to near real-time audio or video messages.

FIG. 6 illustrates an exemplary higher-level user interface for user selection of attributes, or bundles of attributes, in respect to near real-time audio or video messages. In accordance with methods known by practitioners of the art, the interface is a pop-up menu 605 of entries that represent message attributes or bundles of message attributes, sometimes referred to herein as "services", suitable for aggregation and presentation in lower-level user interfaces. In some cases, services are selectable 615 and, in other cases, are expandable 620 and, if expanded 625 contain submenus of additional selectable options 630, representing alternatives among other distinguishing attributes. Where appropriate, the interface displays a corresponding counter 635 representing unplayed messages not filtered out in accordance with the present invention.

Figure 7:
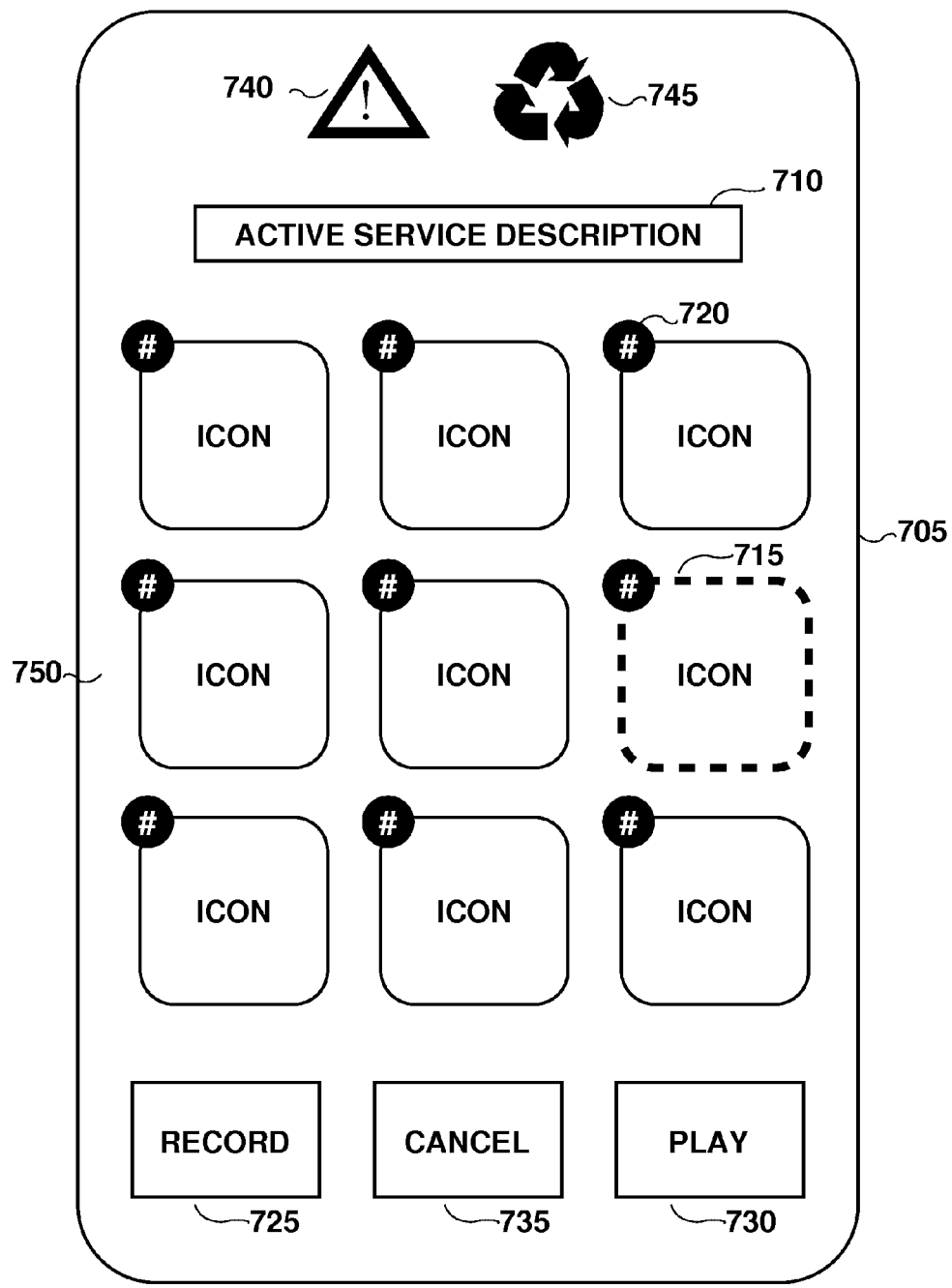
FIG. 7 illustrates an exemplary lower-level user interface for user selection of attributes in respect to near real-time audio or video messages, and submitting record or play instructions.

FIG. 7 illustrates an exemplary lower-level user interface for user selection of attributes in respect to near real-time audio or video messages, and submitting record or play instructions. In accordance with methods known by practitioners of the art, the interface 705 has an identifying label 710 that summarizes the choices made in the pop-up menu (representing, in this case, a "service"); a scrollable central region 750 of icons that represent a final attribute for selection 715, which may be a multi-selection; a counter for messages associated with such final attribute 720 representing unplayed messages not filtered out in accordance with the present invention; and buttons that instruct the application to record 725, play 730 or cancel 735 audio or video messages with attributes in common with the selected attributes.

In accordance with preferred embodiments of the present invention, and illustrating some of its original, innovative and advantageous aspects, in FIG. 7, the user may select the "urgency" button 740 and/or the "flush" button 745—on/off toggle switches or a pull downs or other implement to enter a value—in order to set the "urgency" flag/delta 435 and/or the "flush" flag/delta 445, prior to sending an audio or video message.

Once the user has made selections via the higher-level interface 605 and the lower-level interface 705, in a preferred embodiment of the present invention, the user has specified a collection of attributes sufficient to send and route outgoing messages in the exemplary near real-time audio or video message communication system illustrated in FIG. 2, and for the presentation in an advantageous order of incoming messages advantageously filtered, in accordance with the present invention.

Data associated with audio or video near real-time messages are usable, among other things known to practitioners of the art, to uniquely identify the message, the time and place of recording, the sender and the intended recipient(s); to route a message; to characterize the subject matter of a message; to manipulate or transform a message; and to filter, sort, group or aggregate a collection of messages.

In notation used herein, data associated with a single message is represented by a tuple t of attributes $\{A_1, A_2, \ldots, A_n\}$, with relation R a collection of such tuples.

$$r = \pi_{a_1, a_2, \ldots, a_m}(\sigma_C(R))$$

denotes a selection ($\sigma$) applying conditions C on attributes in R, and a projection ($\pi$) on to a subset of m attributes in R, to produce a new relation r.

$$s = G_{c_1}, G_{c_2}, \ldots, G_{c_j} g_{\underline{f_1(\cdot), f_2(\cdot), \ldots, f_k(\cdot)}}_{\{b_1, b_2, \ldots b_l\}}(r)$$

denotes a grouping (g) in which aggregations $f_1(\bullet)$, $f_2(\bullet), \ldots, f_k(\bullet)$ such as sum, maximum, minimum or count are applied to attributes $\{b_1, b_2, \ldots, b_l\}$, and grouped by other attributes $\{c_1, c_2, \ldots, c_j\}$, in each case drawn from attributes $\{a_1, a_2, \ldots, a_m\}$ of r, to produce a new relation s.

$\tau_L(s)$ denotes a sorting operation, where L is a list of attributes of s, each identified either as an ascending or descending sorting key to be applied successively from left to right.

The following illustrates some general concepts of the present invention in this notation. With relation R representing data associated with a collection of messages $$r = \pi_{urgency, flush, time, played, a_4, a_5, \ldots, a_m}(\sigma_C(R))$$

is a selection ($\sigma$) applying conditions C on message attributes to limit the set of messages under consideration, for example, in connection with a selective user interface presentation of messages with a certain type and/or from a certain sender and/or with certain subject tags; and a projection ($\pi$) of attributes needed for filtering, grouping and presentation, resulting in a new relation r. In accordance with the present invention, included among exemplary projected attributes are urgency, flush and time (for example, epoch).

New relation r' extends with three additional values each tuple x of r, where tuple x satisfies the condition $\sigma_{played=false}$:

$$\text{cumulative\_urgency}^x : \sum_{i=1}^{x} \pi_{urgency}(\tau_{time_{asc}}(\sigma_{C_x}(r)))^i$$

$$\text{cumulative\_flush}^x : \sum_{i=1}^{x} \pi_{flush}(\tau_{time_{asc}}(\sigma_{C_x}(r)))^i$$

$$\text{sum\_flush}^x : \sum_{i} \pi_{flush}(\sigma_{C_x}(r')).$$

cumulative_urgency is a forward chronological cumulative sum of urgency values (0 or 1 if implemented as a boolean) of tuples representing messages that satisfy a condition $\sigma_{C_x}$ that embodies a selective user interface presentation, for example, a requirement that messages have a common sender $\sigma_{r_{sender}^i = r_{sender}^x}$. cumulative_flush is a forward chronological cumulative sum of flush values of tuples representing messages that satisfy condition $\sigma_{C_x}$. sum_flush is a sum of flush values of all tuples, regardless of chronology, representing messages that satisfy condition $\sigma_{C_x}$.

To transform r' into an advantageously reduced result set:

$$r'' = \sigma_{cumulative\_flush >= sum\_flush}(r')$$

which is suitable for aggregation, for example, in connection with a selective user interface presentation of pending message counts according to sender:

$$s = G_{sender} g_{count(\bullet)}(r'')$$

To transform r'' into an advantageously sorted result set, for example, in connection with user interface presentation of playable messages, or operation of a button that plays the next message from a plurality of playable messages:

$$r''' = \tau_{cumulative\_urgency_{desc}, time_{asc}}(\sigma_{C_y}(r''))$$

where condition $\sigma_{C_y}$ represents, for example, user interface selection of a particular sender.

Although the above illustration uses additive cumulation and summation functions, and inequalities that are not strict, there are a variety of alternative mathematical transformations of the aforementioned relations, such as subtractive cumulation, negative summation, products or geometric progression, and consonant conditions such as strict inequalities or equalities, in each case, obvious to practitioners of the art with the benefit of the disclosure, that effect the same reduction and sorting.

In preferred embodiments of the present invention, attributes of audio or video near real-time messages are represented, in a manner known to practitioners of the art, by relational SQL databases, a decomposition of such a relation R into normalized relvars $\{R_1, R_2, \ldots, R_n\}$, each a table with a header, attributes drawn from attributes $\{A_1, A_2, \ldots, A_n\}$, primary and/or foreign keys and integrity constraints. Selections ($\sigma$) and projections ($\pi$) operate on a relation $\hat{R}_s$ recomposed via a series of joins ($\bowtie$) on a subset of such relvars $$\hat{R}_s = R_a \bowtie_{C_s} R_b \bowtie_{C_s} R_c, \ldots$$

In such preferred embodiments, aggregations representing alternative groupings, for example, the presentation of counts in a higher-level user interface representing multiple service types 605, will consist of separate selection ($\sigma$) and projection ($\pi$) operations on recompositions of tailored subsets of relvars:

$$\hat{r}_1 = \pi_{urgency, flush, time, played, a_4^1, a_5^1, \ldots, a_x^1}(\sigma_{C_1}(\hat{R}_1)),$$

$$\hat{r}_2 = \pi_{urgency, flush, time, played, a_4^2, a_5^2, \ldots, a_y^2}(\sigma_{C_2}(\hat{R}_2)),$$

$$\hat{r}_3 = \pi_{urgency, flush, time, played, a_4^3, a_5^3, \ldots, a_z^3}(\sigma_{C_3}(\hat{R}_3)), \ldots$$

New relation $\hat{r}_x'$ extends each tuple of $\hat{r}_x$ which satisfies the condition $\sigma_{played=false}$ with the aforementioned values cumulative_urgency, cumulative_flush and sum_flush as above, with advantageous reductions of each relation:

$$\hat{r}_1'' = \sigma_{cumulative\_flush >= sum\_flush}(r_1'),$$

$$\hat{r}_2'' = \sigma_{cumulative\_flush >= sum\_flush}(r_2'),$$

$$\hat{r}_3'' = \sigma_{cumulative\_flush >= sum\_flush}(r_3'), \ldots$$

with such exemplary presentation of aggregates according to:

$$\hat{s} = G_{identifier_1} G_{attribute_1} g_{count(\cdot)}(\hat{r}_1'''),$$

$$\cup G_{identifier_2} G_{attribute_2} g_{count(\cdot)}(\hat{r}_2''')$$

$$\cup G_{identifier_3} G_{attribute_3} g_{count(\cdot)}(\hat{r}_3'''), \ldots$$

each representing a "service" or attribute bundle identifier, grouped by attribute$_x$.

To transform $\hat{r}''$ into an advantageously sorted result set, for example, in connection with user interface presentation of playable messages, or operation of a button that plays the next message from a plurality of playable messages:

$$\hat{r}''' = \tau_{cumulative\_urgency_{desc},time_{asc}}(\sigma_{C_y}(\hat{r}''))$$

where condition $\sigma_{C_y}$ represents, for example, user interface selection of a particular sender.

The use of relational databases in preferred embodiments is not intended to in any way limit the scope of the present invention, which can be implemented by practitioners of the art with the benefit of the disclosure using "noSQL" databases, denormalized records, key-value stores, and other data storage and retrieval methods and techniques.

Figure 8:
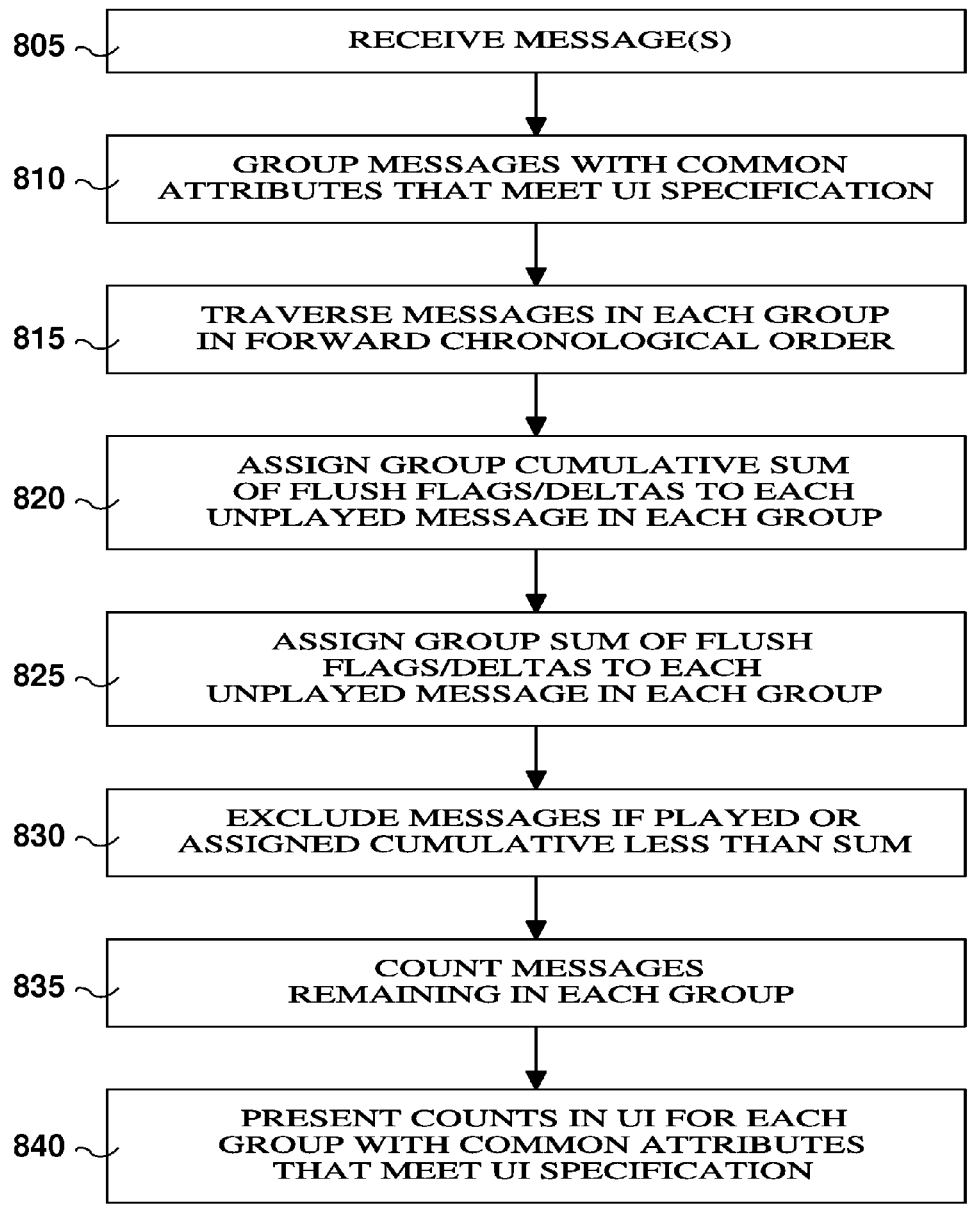
FIG. 8 is a flowchart illustrating an exemplary process for grouping and filtering near real-time audio or video messages to present in a user interface aggregates based on advantageously reduced sets.

FIG. 8 is a flowchart illustrating an exemplary process for grouping and filtering audio or video near real-time messages to present in a user interface aggregates of advantageously reduced sets of messages. In accordance with preferred embodiments of the present invention, and illustrating some of its original, innovative and advantageous aspects, in FIG. 8, one or more audio or video messages are received 805, including data representing associated attributes. Inbound messages with common attributes that meet a user interface specification are grouped together 810, a step known to practitioners of the art and performed in a wide range of typical user interface paradigms; for example, grouping of messages according to common type, and/or sender and/or subject tag. The next steps are to traverse the messages in each group in forward chronological order 815 and, in the course of such traversal, to assign to each message that is unplayed (according to a corresponding attribute) the cumulative sum of the flush flags/deltas for the messages in the group 820, and to calculate a sum of the flush flags/deltas for all the messages in the group 825. From each group, messages are excluded 830 if already played or if the cumulative value of flush flags/deltas assigned is less than the sum of flush flags/deltas for all messages in the group. A count of messages remaining in each group 835 is presented in the user interface 840.

FIG. 9 is an SQLite database definition illustrating an exemplary representation of data associated with audio or video near real-time messages, set forth as table create operations 900. In preferred embodiments of the present invention, in accordance with methods typical for near real-time messaging and known by practitioners of the art, parallel or separate background processes inject into the database 900 data representing attributes of outgoing messages upon a recording event; retrieve from the database 900 data representing attributes of outgoing messages, and assemble and transmit to the messaging server 210 data transport records 305 and relational database records referenced therein; receive from the messaging server 210 data transport records 305 and relational database records referenced therein, and perform injections into the database 900 representing attributes of incoming messages; and update attributes of messages upon a play event.

FIG. 10 is an SQLite database query illustrating an exemplary implementation of grouping and filtering audio or video near real-time messages that aggregates advantageously reduced sets grouped according to sender. In a preferred embodiment of the present invention, one of the user interface specifications that may be selected in a higher-level user interface 605 is standard one-to-one (or one-to-many) messaging, denoted type "pathway"; the user's selection determines the choice of a lower-level user interface 705 and database query. In this implementation, a lower-level user interface is built with the result set of query 1000, with icons 715 representing users with whom one can exchange messages. The query requires message type "pathway", and calculates additive cumulations and summations for messages that share a common relation authorizing inbound messages from a particular other user, which effects the desired grouping. In accordance with the present invention, and illustrating some of its original, innovative and advantageous aspects, the result set value assigned to the counter 720 associated with each icon excludes a message if already played or the cumulative value of the flush flags/deltas assigned to it, calculated traversing messages in the group chronologically, is less than than the sum of flush flags/deltas for all the messages in the group. This advantageous reduction excludes from the counter messages that, in the judgment of the sender, no longer have continuing relevance and currency.

FIG. 11 is an SQLite database query illustrating an exemplary implementation of grouping and filtering audio or video near real-time messages that aggregates advantageously reduced sets grouped according to subject tag. In a preferred embodiment, one of the user interface specifications that may be selected in a higher-level user interface 605 is "assistant" messaging with a particular other user, in which messages are associated with subject tags from a predefined set; the user's selection determines the choice of a lower-level user interface 705 and database query. In this implementation, a lower-level user interface is built with the result set of query 1100, with icons 715 representing subject tags associated with exchanged messages. The query requires message type "assistant" and a particular sender, and calculates additive cumulations and summations for messages that share a common subject tag, which effects the desired grouping. In accordance with the present invention, and illustrating some of its original, innovative and advantageous aspects, the result set value assigned to the counter 720 associated with each icon excludes a message if already played or the cumulative value of the flush flags/deltas assigned to it, calculated traversing messages in the group chronologically, is less than the sum of flush flags/deltas for all the messages in the group. This advantageous reduction excludes from the counter messages that, in the judgment of the sender, no longer have continuing relevance and currency for the associated subject tag.

FIG. 12 is a flowchart illustrating an exemplary process for grouping, filtering and sorting audio or video near real-time messages that identifies and plays the next message from an advantageously reduced set sorted in an advantageous order. In accordance with preferred embodiments of the present invention, and illustrating some of its original, innovative and advantageous aspects, in FIG. 12, the user provides a play instruction with selected attributes 1205, including the attributes associated with a current user interface specification and one or more selections; for example, in a lower-level user interface 705 for messages of a particular type, the user selects one or more icons 715 that represent senders, and presses the play button 730. Messages that meet the current user interface specification and selections are grouped together 1210. The next steps are to traverse the messages in the group in forward chronological order 1215 and, in the course of such traversal, to assign to each message that is unplayed (according to a corresponding attribute) the cumulative sum of the "urgency" flags/deltas for messages in the group 1220, to assign to each message that is unplayed (according to a corresponding attribute) the cumulative sum of the flush flags/deltas for messages in the group 1225, and to calculate a sum of the flush flags/deltas for all messages in the group 1230. A message is excluded 1235 if already played or if the cumulative value of flush flags/deltas assigned to the message is less than the sum of flush flags/deltas for all messages in the group. The next message played 1240 is the message remaining with the earliest timestamp and the maximum assigned cumulative sum of "urgency" flags/deltas. With respect to judgments by a sender, this advantageously presents messages of greater importance first, preserves forward chronological presentation of messages of equal importance, and excludes obsolete messages.

It is noted that, in some preferred embodiments, the selection of more than one icon 715 in a lower-level user interface groups together messages from multiple senders, whose judgments about "urgency" and "flush" are then treated equally and collectively in the performance of reduction and sorting in accordance with the present invention.

FIG. 13 is an SQLite database query illustrating an exemplary implementation of grouping, filtering and sorting audio or video near real-time messages, from one or more selected senders, that identifies the next to play from an advantageously reduced set in an advantageous order. In a preferred embodiment of the present invention, one of the user interface specifications that may be selected in a higher-level user interface 605 is standard one-to-one (or one-to-many) messaging, denoted type "pathway"; the user's selection determines the choice of a lower-level user interface 705 and database query. In this implementation, the user selects one or more icons 715 representing users with whom one can exchange messages. The query 1300 requires message type "pathway" and a relation authorizing incoming messages from any of the users selected, which effects the desired grouping. In accordance with the present invention, and illustrating some of its original, innovative and advantageous aspects, the query excludes a message if already played or the cumulative value of the flush flags/deltas assigned to it, calculated traversing the messages in the group chronologically, is less than than the sum of flush flags/deltas for all the messages in the group; sorts the remaining messages according to their assigned cumulative urgency value (descending), and the epoch or recording time (ascending), applied left to right; and identifies the next message to play. With respect to judgments by senders, considered collectively, this advantageously presents messages of greater importance first, preserves forward chronological presentation of messages of equal importance, and excludes obsolete messages.

FIG. 14 is an SQLite database query illustrating an exemplary implementation of grouping, filtering and sorting audio or video near real-time messages, associated with one or more selected subject tags, that identifies the next to play from an advantageously reduced set in an advantageous order. In a preferred embodiment, one of the user interface specifications that may be selected in a higher-level user interface 605 is "assistant" messaging with a particular other user, in which messages are associated with subject tags from a predefined set; the user's selection determines the choice of a lower-level user interface 705 and database query. In this implementation, the user selects one or more icons 715 representing subject tags associated with exchanged messages. The query 1400 requires message type "assistant", a relation authorizing incoming messages from a particular sender, and any of the subject tags selected, which effects the desired grouping. In accordance with the present invention, and illustrating some of its original, innovative and advantageous aspects, the query excludes a message if already played or the cumulative value of the flush flags/deltas assigned to it, calculated traversing messages in the group chronologically, is less than than the sum of flush flags/deltas for all the messages in the group; sorts the remaining messages according to their assigned cumulative urgency value (descending), and the epoch or recording time (ascending), from left to right; and identifies the next message to play. With respect to judgments by the sender, considered collectively according to the selected subject tag(s), this advantageously presents messages of greater importance first, preserves forward chronological presentation of messages of equal importance, and excludes obsolete messages.

In a manner obvious to practitioners of the art with the benefit of the disclosure, alternative embodiments precalculate and store cumulations and summations in a convenient data record upon receipt of each message, rather than performing such calculations at the time of a user interface presentation or play event. FIG. 15 is a series of SQLite operations 1500 illustrating an exemplary implementation in which, at the time of injection of a transport data record, an insert into the RELATION table 1501 holds cumulative values for "urgency" and "flush" for all messages with the same sender and type "pathway", with the current value of such cumulations injected into the MESSAGE table 1507; which simplifies and streamlines queries for aggregation by sender 1525 and next message to play by sender 1546. While this approach offers computational efficiencies, there is less flexibility for the user interface to offer multiple selections.

Figure 16:
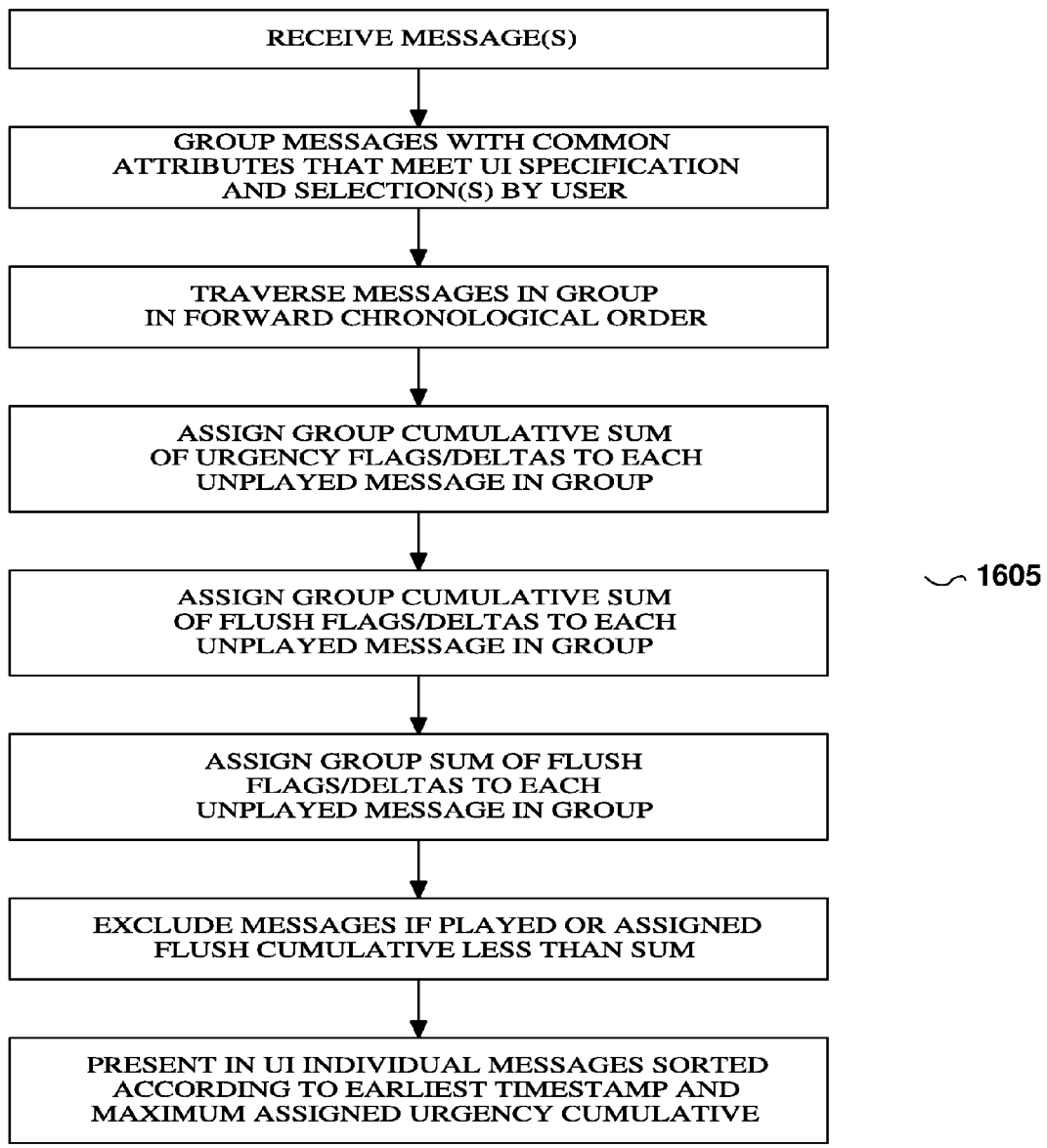
FIG. 16 is a flowchart similar to FIG. 12, illustrating an exemplary process that presents in a user interface an advantageously sorted list of near real-time audio or video messages available for play, after an advantageous reduction.

FIG. 16 is a flowchart similar to FIG. 12, illustrating an exemplary process that presents in a user interface an advantageously sorted list of messages available for play that fit the user interface specification and the user's selections, after an advantageous reduction, in accordance with the present invention. FIG. 17 is an exemplary implementation of an SQLite database query, similar to FIG. 13, that produces an advantageously sorted list of messages available for play, associated with one or more selected senders, after an advantageous reduction in accordance with the present invention. FIG. 18 is an exemplary implementation of an SQLite database query, similar to FIG. 14, that produces an advantageously sorted list of messages available for play, associated with one or more selected subject tags, after reduction and sorting in accordance with the present invention.

As discussed herein, in some preferred embodiments, user interface specifications and user selections may group together messages from multiple senders, whose judgments about "urgency" and "flush" are then treated equally and collectively in respect to reduction and sorting in accordance with the present invention. In additional preferred embodiments, special purpose services mediated by a messaging server 210 apply common attributes to messages from multiple senders that facilitate such a grouping together.

Figure 19:
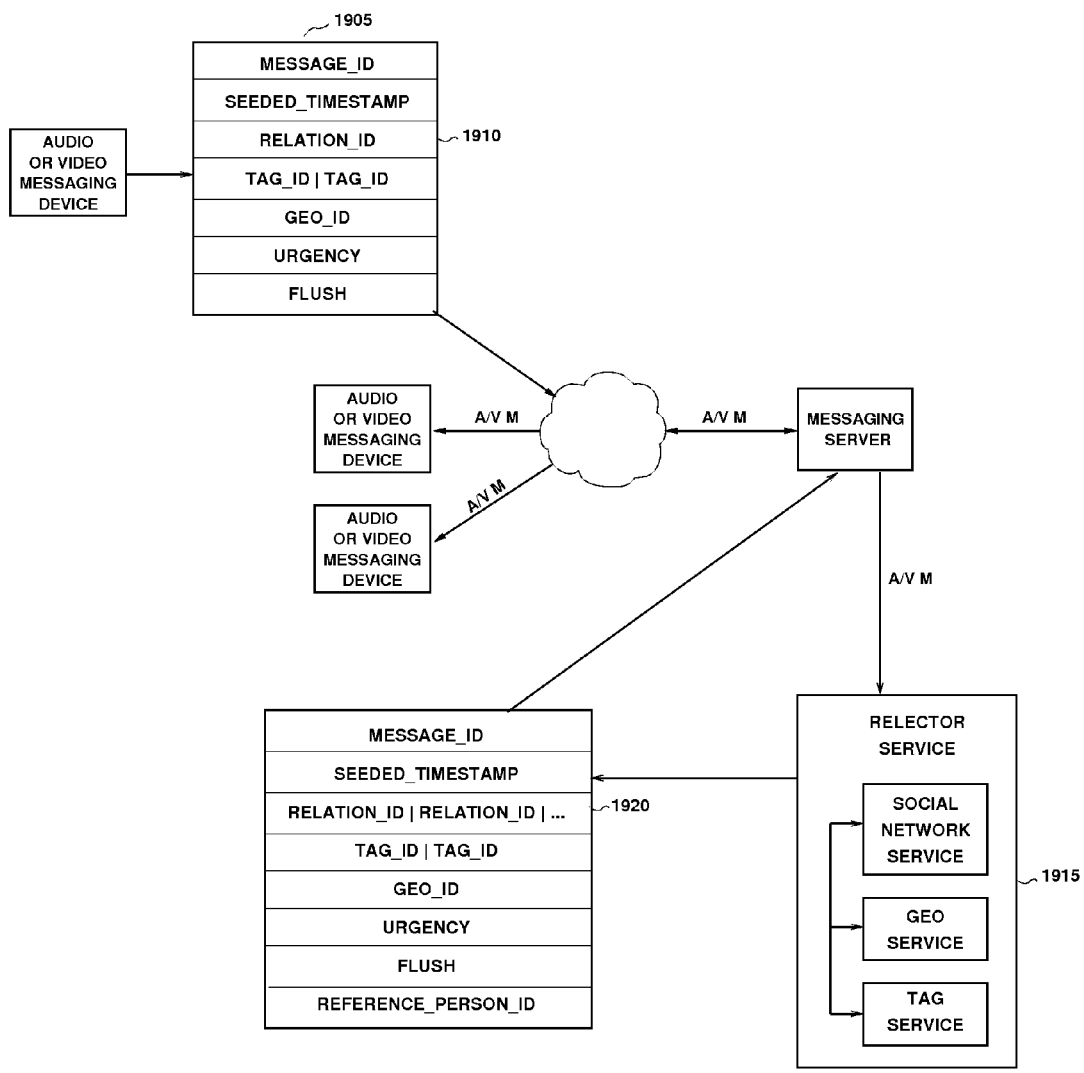
FIG. 19 illustrates an exemplary near real-time audio or video messaging communication system in which audio or video near real-time messages are routed, redirected or reflected to recipients according to a combination of social network, geographical and subject tag data.

FIG. 19 illustrates an exemplary audio or video near real-time messaging communication system in which messages are routed, redirected or reflected to recipients using social network, geographical and subject tag data in accordance with the present invention. In accordance with methods known by practitioners of the art, in the exemplary transport data record 1905, a relation_id record 1910 references a relationship between a sending user and a notional user representing a special purpose service. Receipt of the data record by the messaging server 1915 triggers a special purpose service that utilizes fields of the data record and additional data accessible by the messaging server and/or supporting databases and analytical servers 1915 (referred to herein as "reflector" services) to replace or augment the fields of the data record. A preferred embodiment group chat service rewrites the relation_id 1920 record to reference a plurality of relationships 1925 between the notional user and recipient users held in the database records of the messaging server, and adds an additional field reference_person_id which passes the identity of the sender. In accordance with the present invention, and illustrating some of its original, innovative and advantageous aspects, recipients then have the option to group messages in accordance with user interface specifications and selections such as membership in a group chat, by sender or common subject tags, for the purpose of filtering and sorting in accordance with the present invention.

A preferred embodiment social networking service for broadcast multicasting performs a similar rewrite and augmentation of the data transport record using social networking data held on supporting servers providing reflector services 1815, which multicasts messages to recipients according to subject tags and degrees of separation in a social graph. A preferred embodiment geolocation-based broadcasting service performs a similar rewrite and augmentation of the data transport record using geolocation data held on supporting servers providing reflector services 1815, which multicasts messages to recipients according to subject tags and geographic proximity. In these additional preferred embodiments, recipients then have the option to group messages in accordance with user interface specifications and selections, such as by degree of separation in a social graph, or by sender, subject tag or geo-proximity, for the purpose of filtering and sorting in accordance with the present invention.

What is claimed is:

1. A computer implemented method of reducing the number of audio or video messages displayed or played in a user interface, comprising:
   receiving over a communication network a plurality of messages, each comprising:
   (a) a timestamp or other indicator of chronological order, and
   (b) at least one additional attribute in accordance with a user interface specification comprising the grouping of messages by common attributes;
   collecting a subset of said plurality of messages into one or more sets in accordance with said specification, wherein each of said sets comprises:
   (i) at least one message comprising audio or video content directly or by reference,
   (ii) at least one message comprising a sender designated prior message exclusion attribute, and
   (iii) at least one message comprising a timestamp or other indicator of chronological order that precedes the timestamp or other indicator of chronological order of another message in said set that comprises said exclusion attribute;
   reducing at least one of said sets by identifying the most recent message comprising said exclusion attribute in said set, according to said timestamp or other indicator of chronological order, and excluding messages in said set that comprise an earlier said timestamp or other indicator of chronological order; and
   displaying, in accordance with said specification, a representation comprising at least one of said reduced sets, or playing a message comprising audio or video content directly or by reference in at least one of said reduced sets.

2. The method of claim 1 wherein said specification groups messages into sets for reduction, and display or play, in accordance with one or more of the following common attributes: sender, named category or hashtag, geolocation proximity, social network proximity, rating of a sender or message, or message type according to a classification scheme.

3. The method of claim 1 wherein said exclusion attribute represents a judgment communicated by the sender of said message that other messages grouped therewith, in accordance with said specification, that comprise a timestamp or other indicator of chronological order that precedes the timestamp or other indicator of chronological order of said message comprising said exclusion attribute, are no longer current or relevant and should, therefore, no longer be displayed or played in said user interface.

4. The method of claim 1 wherein said displayed representation comprises a count and a set identifier.

5. The method of claim 1 further comprising:
   selecting in said user interface at least two of said sets;
   combining the messages in said selected sets before reduction into a new set;
   performing, for said new set, said reduction;
   displaying, in accordance with said specification, a representation comprising said reduced set, or playing a message comprising audio or video content directly or by reference in said reduced set.

6. The method of claim 2 further comprising at least one selection action in said user interface, and the collection of messages into at least one set containing at least two messages comprising different sender attributes prior to reduction.

7. The method of claim 2 further comprising at least one selection action in said user interface, and the collection of messages into at least one set containing at least two messages comprising different named category or hashtag attributes prior to reduction.

8. The method of claim 2 further comprising at least one selection action in said user interface, and the collection of messages into at least one set containing at least one message comprising a sender attribute and a named category or hashtag attribute prior to reduction.

9. A computer implemented method of sorting audio or video messages displayed or played in a user interface, comprising:
   receiving over a communication network a plurality of messages, each comprising:
   (a) a timestamp or other indicator of chronological order, and
   (b) at least one additional attribute in accordance with a user interface specification comprising the grouping of messages by common attributes;
   collecting a subset of said plurality of messages into one or more sets, in accordance with said specification, wherein each of said sets comprises:
   (i) at least one message comprising audio or video content directly or by reference,
   (ii) at least one message comprising a sender designated relative prioritization attribute, and
   (iii) at least one message comprising a timestamp or other indicator of chronological order that precedes the timestamp or other indicator of chronological order of a message in said set that comprises said prioritization attribute;

calculating, for at least one of said sets, for each message therein, counts or other strictly monotonic aggregates, or strictly negative monotonic aggregates, of said prioritization attributes included in itself or messages in said set comprising a timestamp or other indicator of chronological order that precedes its timestamp or other indicator of chronological order;

sorting at least one of said sets in accordance with the results of said calculations, in descending order in the event said calculations are counts or strictly monotonic aggregates, or in ascending order in the event said calculations are negative strictly monotonic aggregates;

displaying, in accordance with said specification, a representation comprising at least one of said sorted sets, or playing the next message comprising audio or video content directly or by reference in at least one of said sorted sets.

10. The method of claim 9 wherein said prioritization attribute represents a judgment communicated by the sender of said message that messages grouped therewith, in accordance with said specification, that comprise a timestamp or other indicator of chronological order that precedes the timestamp or other indicator of chronological order of said message comprising said prioritization attribute, are less urgent and should therefore be displayed less prominently, or played later, in said user interface in accordance with said sorting.

11. The method of claim 9 wherein said specification groups messages into sets for sorting, and display or play, in accordance with one or more of the following common attributes: sender, named category or hashtag, geolocation proximity, social network proximity, rating of a sender or message, or message type according to a classification scheme.

12. The method of claim 11 further comprising at least one selection action in said user interface, and the collection of messages into at least one set containing at least two messages comprising different sender attributes prior to said sorting.

13. The method of claim 11 further comprising at least one selection action in said user interface, and the collection of messages into at least one set containing at least two messages comprising different named category or hashtag attributes prior to said sorting.

14. The method of claim 11 further comprising at least one selection action in said user interface, and the collection of messages into at least one set containing at least one message comprising a sender attribute and a named category or hashtag attribute prior to said sorting.

15. The method of claim 9 further comprising a secondary sorting factor of forward chronological order of said timestamp or other indicator of chronological order, applied to further sort subsets of said sorted sets wherein said results of said calculations are equivalent.

16. The method of claim 9 wherein said prioritization attribute is a positive or negative value expressing the relative direction and intensity of a judgment communicated by the sender of said message regarding the urgency of messages grouped therewith, in accordance with said specification, that comprise a timestamp or other indicator of chronological order that precedes the timestamp or other indicator of chronological order of said message comprising said prioritization attribute, and should therefore be displayed more or less prominently; or played earlier or later, in accordance with said sorting.

17. A computer implemented method of reducing the number of audio or video messages displayed or played in a user interface, comprising:

receiving over a communication network a plurality of messages, each comprising:
(a) a timestamp or other indicator of chronological order, and
(b) at least one additional attribute in accordance with a user interface specification comprising the grouping of messages by common attributes;

collecting a subset of said plurality of messages into one or more sets, in accordance with said specification, wherein each of said sets comprises:
(i) at least one message comprising audio or video content directly or by reference,
(ii) at least one message comprising a sender designated prior message exclusion attribute, and
(iii) at least one message comprising a timestamp or other indicator of chronological order that precedes the timestamp or other indicator of chronological order of a message in said set that comprises said exclusion attribute;

calculating, for at least one of said sets, counts or other strictly monotonic aggregates, or strictly negative monotonic aggregates, of each of the following (1) and (2):
(1) said exclusion attributes included in any message in said set;
(2) for each message in said set, said exclusion attributes included in itself or any messages in said set comprising a timestamp or other indicator of chronological order that precedes its timestamp or other indicator of chronological order;

reducing at least one of said sets by excluding at least one message for which:
(A) said count of (1) exceeds said count of (2), wherein each of said calculations is a count, or
(B) said aggregate of (1) exceeds said aggregate of (2), wherein each of said calculations is another strictly monotonic aggregate, or
(C) said aggregate of (2) exceeds said aggregate of (1), wherein each of said calculations is a negative strictly monotonic aggregate; and displaying, in accordance with said specification, a representation comprising at least one of said reduced sets, or playing a message comprising audio or video content directly or by reference in at least one of said reduced sets.

18. The method of claim 17 wherein said exclusion attribute represents a judgment communicated by the sender of said message that other messages grouped therewith, in accordance with said specification, that comprise a timestamp or other indicator of chronological order that precedes the timestamp or other indicator of chronological order of said message comprising said exclusion attribute, are no longer current or relevant and should, therefore, no longer be displayed or played in said user interface.

19. The method of claim 17 wherein said exclusion attribute is a positive or negative value expressing the relative direction and intensity of a judgment communicated by the sender of said message regarding the currency and relevance of other messages grouped therewith, in accordance with said specification, that comprise a timestamp or other indicator of chronological order that precedes the timestamp or other indicator of chronological order of said message comprising said exclusion attribute, and which of said messages are, therefore, no longer current or relevant enough to be displayed or played in said user interface.

20. The method of claim 17 wherein said specification groups messages into sets for reduction, and display or play, in accordance with one or more of the following common attributes: sender, named category or hashtag, geolocation proximity, social network proximity, rating of a sender or message, or message type according to a classification scheme.

21. The method of claim 20 further comprising at least one selection action in said user interface, and the collection of messages into at least one set containing at least two messages comprising different sender attributes prior to reduction.

22. The method of claim 20 further comprising at least one selection action in said user interface, and the collection of messages into at least one set containing at least two messages comprising different named category or hashtag attributes prior to reduction.

23. The method of claim 20 further comprising at least one selection action in said user interface, and the collection of messages into at least one set containing at least one message comprising a sender attribute and a named category or hashtag attribute prior to reduction.

* * * * *